United States Patent Office 3,210,273
Patented Oct. 5, 1965

3,210,273
ORGANIC LIQUIDS THICKENED WITH
ORGANO-SILICA AEROGELS
Thomas A. Taulli, Florissant, Mo., assignor to Monsanto
Company, a corporation of Delaware
No Drawing. Filed June 13, 1962, Ser. No. 202,088
18 Claims. (Cl. 252—28)

The present invention relates to organic liquids thickened with novel thickening agents. The present invention further relates to organic liquid compositions or formulations containing plastic or resinous substances and thickened with small amounts of certain novel compounds, particularly certain novel organo-silica aerogels.

The desirability of thickening organic liquids for use in certain applications has been widely recognized and it has been proposed heretofore to thicken a variety of such liquids by incorporating therein inert inorganic materials including mica, diatomaceous earth, talc, alumina, graphite and the like, and in particular, silica aerogels. For example, it has been proposed, in U.S. Patent 2,260,625, issued to Samuel S. Kistler to thicken oily liquids, such as lubricating oils, and to convert such oils into greases by incorporating silica aerogels in amounts up to as high as 50% in such oils. Silica aerogels described in U.S. Patent 2,285,449, issued June 9, 1942, to Morris D. Marshall and U.S. Patent 2,285,477, issued June 9, 1942, to John F. White have also been used to thicken oils. Also, for example, it has been proposed in U.S. Patent No. 2,892,730, issued to Harry Kloepfer and Otto Schweitzer to thicken organic liquids containing high molecular weight film formers, such as nitrocellulose, cellulose acetate, polyvinyl acetate, chlorinated rubber and the like dissolved in organic solvents, with oxides of silicon, aluminum and titanium, to prevent the settling of mineral fillers therefrom.

It has also been proposed in U.S. Patent No. 2,610,960, issued to Birger W. Nordlander, to thicken, and/or render thixotropic, coating and filling compositions such as polymerizable organic liquids consisting of liquid polyester resins by the incorporation of vermiculite in an amount as high as 50% by weight of the vermiculite in such liquids. It has also been proposed in U.S. Patent No. 2,887,461, issued to Eugene V. Horst, to render thixotropic, laminating compositions consisting of solid polyester resins dissolved in styrene by the incorporation of silica aerogels, such as the silica aerogel described in the aforesaid Kistler, Marshall or White patents or mixtures of such silica aerogel and alumina in amounts as high as 20% by weight of such inorganic materials in the liquids. By thickening and/or rendering such liquids thixotropic, it has been possible to overcome the problem of drainage of such compositions away from the coated or filled objects to which the composition has been applied.

However, the above-described thickening agents possess certain disadvantages, in that relatively large amounts of such materials are required to significantly thicken or increase the viscosity of organic liquids and/or render these liquids capable of forming thixotropic gels. Thus, for example, the thickening agents when used in large quantities, in some instances, adversely affect the properties of such organic liquids or the use thereof, while in other instances, the cost of these thickening agents renders their use, in the large quantities normally required, economically prohibitive. Although silica aerogels of the type described in the aforementioned Marshall or White patents have been used as thickening agents for oils, the utility of these materials is limited, particularly where it is desired to thicken polymerizable organic liquids, such as plastisols, polyesters and epoxide resins, prior to the curing of these materials. In using these liquid resins, the polymerizable resins, particularly polyesters, or solutions thereof are applied as filling and coating compositions or films as desired, following which the curing of the resin is caused to take place. One of the problems encountered in applying liquid resins, for example, in the fabrication of laminates such as fibre glass, is the tendency of the liquid to flow or drain away from the surface to which it is applied when such surface is not disposed in the horizontal plane as is frequently the case. Thus, it has been necessary to incorporate relatively large amounts, e.g., up to 20% by weight, of the silica aerogels of Marshall and White in such polymerizable liquids to obtain thickening and prevent drainage, although it is known that amounts in excess of 5% by weight of silica aerogels in such liquids usually adversely affect the properties of the polymers when cured. Generally stated, the silica aerogels of the type described in the aforementioned Marshall or White patents are relatively inefficient and uneconomical for use as thickening agents for organic liquids.

In accordance with the present invention it is possible to thicken organic liquids by incorporating in such liquids novel, amorphous, organo-silica aerogels which are unexpectedly efficient thickening agents and do not have the aforementioned disadvantages inherent in previously known silica aerogels of the kind described by Marshall or White.

It is one object of the present invention to provide organic liquids thickened with novel thickening agents.

It is another object of this invention to provide compositions comprising organic liquid oily or lubricating substances thickened with relatively small amounts of certain novel organo-silica aerogels.

It is also an object of this invention to thicken organic liquids economically and/or without appreciably altering the useful properties of such liquids or the end products made therefrom.

It is a more particular object of the present invention to provide compositions comprising liquid plastisols or resins thickened and/or made thixotropic by the incorporation therein of relatively small amounts of certain novel amorphous organo-silica aerogels and which are useful in a wide variety of commercial applications.

These and other objects and advantages of the present invention will become apparent from the following description and the appended claims.

The novel compositions of the present invention comprise an organic liquid and an amount, sufficient to thicken or increase the viscosity of such liquid, of a finely divided, amorphous, organo-silicia aerogel comprising a silica polymer having siloxy groups and containing carbon and hydrogen atoms chemically bound to a portion of the siloxy groups in the aerogel. Such organo-silica aerogels are usually characterized in having an $SiO_2$ to carbon atom ratio of from about 10:1 to about 50:1 and an $SiO_2$ to hydrogen atom ratio of from about 0.77:1 to about 2:1. Stated differently, the organo-silica aerogels usually contain from about 0.4% to about 1.2% by weight of carbon and from about 0.9% to about 1.5% by weight of hydrogen.

The finely divided, amorphous, organo-silica aerogels which are preferred for inclusion in the compositions of the present invention are usually further characterized in having an average particle size of from about 1.0 to about 2.5 microns, a specific surface area of from about 100 to about 400 square meters per gram and an external surface area of from about 1.70 to about 1.95 square meters per gram. The measurement of the specific surface area of the organo-silica aerogels may be made in accordance with the method of Brunauer, Emmet and Teller described in "Advances in Colloid Science," volume I, pages 1–36 (1942), and published by Interscience Publishers, New York, N.Y. The particle size and external surface area of the organo-silica aerogels may be determined using the method of J. H. L. Watson described in "Analytical Chemistry," volume 20, page 576 (1948).

The novel amorphous finely divided organo-silica aerogels are prepared from acidic silica hydro-organosols which are believed to contain aggregates of colloidal silica and/or polysilicic acid dispersed in the liquid phase thereof. It is believe that these aggregates initially range in size from 10 to 100 angstroms, as the sols are freshly prepared, but such aggregates continue to grow through siloxane polymerization as the sol ages and/or is heated until a hydro-organogel is formed. The rate at which such aggregates will grow generally depends upon the concentration of the silica, temperature and the amount of water miscible organic liquid present in the sol as initially prepared. The silica hydro-organosols containing the aggregates are further characterized in having a large number, e.g., 1000 or more, of silanol

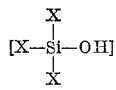

groups on their surfaces, where X in the accompanying formula may be either a siloxane radical, a polysiloxane radical as hereinbefore described, or a hydroxyl group. These aggregates are hydrophilic yet water-insoluble and are referred to herein as hydrophilic silica aggregates containing a multiude of silanol groups.

When such hydro-organosols, which comprise colloidally dispersed aggregates of hydrophilic silica or polysilicic acid containing a multiude of silanol groups and a relatively highly concentration (e.g., from about 8 to 20 mols per mol of $SiO_2$) of water miscible organic liquid, are converted to a silica aerogel and are heated, a reaction takes place between some of the molecules of the organic liquid remaining in the aerogel and the siloxy or silanol groups. Although the exact nature of the reaction is unknown, the reaction in part is believed to be a condensation reaction in which, for example, an alcohol reacts with a silanol group substantially as follows:

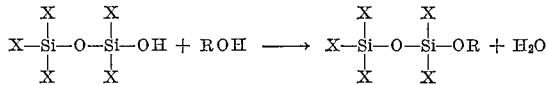

wherein R is an organic group or radical such as $CH_3$, $C_2H_5$ or the like and X is as previously described.

Such chemical bonding is believed to be accomplished as heat or polymerization proceeds until some of the carbon atoms in the organic groups are chemically bonded as heretofore indicated to a portion of the siloxy groups in the silica aerogel. The hydrogen atoms are believed to be both in the polymer in the form of silanol groups and as hydrocarbon hydrogen.

The novel, amorphous, finely divided, organo-silica aerogels which are particularly preferred for use in the compositions of the present invention have the aforementioned properties and, in addition, have at least one or all of the following characteristics (a) a total pore volume of from about 600 to about 800 milliliters per gram, (b) an average pore radius of between about 100 and 200 angstroms and (c) a particle size distribution of from about 0.5 to slightly less than 6.0 microns.

The amount of the novel, organo-silica aerogels which may be employed in the compositions of the present invention may vary to some extent, depending upon the particular organo-silica aerogel and organic liquid employed, the end use of the particular composition and the degree of thickening required. Generally speaking, compositions containing from about 0.2% to 5.0% by weight of such novel aerogels, based on the weight of the composition, will effectively thicken or substantially increase the viscosity of organic liquids. As noted hereinbefore when prior art thickening agents including previously known silica aerogels are employed in thickening organic liquids such thickening agents are generally employed in amounts of from more than 6.0% up to 50% by weight of the composition.

Any of a wide variety of organic liquids may be employed in the compositions of this invention, but it has been found preferable to employ organic liquids which are liquid in the range of from about −10° C. to about 100° C., more desirably in the range of from about 0° C. to 70° C., at atmospheric pressure. Also it has been found desirable to employ organic liquids having a viscosity in the range of from about 2.5 millipoises to about 3,000 centipoises at a temperature of about 25° C.

The novel organo-silica aerogels which may be suitably employed in the compositions of the present invention comprise two distinct, but inter-related classes having at least the $SiO_2$ to carbon atom and hydrogen atom ratios, particle size, external and specific surface area within the ranges hereinbefore described. However the two classes of organo-silica aerogels differ from each other with respect to chemical composition and, as will be evident hereinafter, with respect to the relative ability to thicken certain classes of organic liquids.

One preferred class of amorphous, finely divided organo-silica aerogels which are suitable for use in the compositions of this invention and which are hereinafter designated as Group I organo-silica aerogels comprise a silica polymer having siloxy groups and containing carbon and hydrogen atoms chemically bound to a portion of the siloxy groups in the aerogel and are further characterized in having an $SiO_2$ to carbon atom ratio of from about 10:1 to about 25:1 and an $SiO_2$ to hydrogen atom ratio of from about 0.77:1 to about 1.3:1. Stated differently these Group I organo-silica aerogels contain from about 0.9% to about 1.2% by weight of carbon and from about 1.2% to about 1.5% by weight of hydrogen.

Another preferred class of the amorphous finely divided organo-silica aerogels which may be suitably employed in the compositions of the present invention and which are hereinafter designated as Group II organo-silica aerogels comprise a silica polymer having siloxy groups and containing carbon and hydrogen atoms chemically bound to a portion of the siloxy groups and are characterized in having an $SiO_2$ to carbon atom ratio of from about 25:1 to about 50:1 and an $SiO_2$ to hydrogen atom ratio of from about 1.3:1 to about 2:1. Stated differently the Group II organo-silica aerogels contain from about 0.4% to about 0.8% by weight of carbon and from about 0.9% to about 1.2% by weight of hydrogen.

The aforementioned two classes of amorphous-finely divided, organo-silica aerogels having the above described chemical composition and physical properties are preferably composed, as noted above, of particles having a particle size distribution in the range of about 0.5 to slightly less than 6 microns. The particle size distribution of these organo-silica aerogels is preferably such that from about 20% to about 30% of the particles have a particle size in the range of between about 0.5 and 1.0 micron, about 20% to about 30% of the particles have a particle size in the range of about 1.0 to 2.0 microns, about 40% to 60% of the particles have a particle size in the range of from about 2.0 to 4.0 microns and from about 3% to 8% of the particles have a particle size greater than 4.0, but less than 6.0 microns.

The finely divided, amorphous, organo-silica aerogels which are employed in the novel compositions of this invention may be prepared by heating silica aerogels, prepared from certain hereinafter described silica hydro-organosols, at a temperature in the range of from about 90° C. to 750° C. until an organo-silica aerogel, having the chemical composition and physical properties hereinbefore described is formed. The heating temperature employed will vary within the above ranges and will generally depend upon the particular silica aerogel which it is desired to obtain. The heating times may vary from a few seconds to several hours depending upon the temperatures used and the particular organo-silica aerogel desired. Generally speaking, however, shorter heating times are employed when higher temperatures are used. The organo-silica aerogels may be obtained in finely divided form by grinding or comminuting the aerogels prior to, during or after heating such aerogols under the above described conditions. Simultaneous heating and comminuting or grinding is the preferred procedure.

One preferred class of organo-silica aerogels which may be employed in the compositions of this invention, hereinbefore described as the Group I organo-silica aerogels, may be prepared by heating the starting silica aerogels at a temperature in the range of from about 90° C. to 375° C. until an organo-silica aerogel having the chemical composition and physical properties of the Group I organo-silica aerogels is formed. The heating times employed generally vary in the range of from three seconds to several minutes and are usually in the range of from about 3 to about 50 seconds when temperatures in the range of 250° C. to 375° C. are employed. These aerogels are ground or comminuted as hereinbefore described to provide finely divided organo-silica aerogels.

Another preferred class of organo-silica aerogels, which may be employed in the compositions of this invention, that is, the Group II organo-silica aerogels, may be prepared by a process which comprises heating a starting silica aerogel at a temperature in the range of from about 350° C. to about 750° C. until an organo-silica aerogel having the chemical composition and physical properties of the Group II organo-silica aerogels is formed. The heating times employed generally vary in the range of from about 15 seconds to 2 hours and are usually in the range of from about 30 to about 90 seconds when temperatures in the range of from about 600° C. to about 700° C. are employed. Alternatively the Group II organo-silica aerogels may also be prepared by heating the Group I organo-silica aerogels under the above described time and temperature conditions. Finely divided organo-silica aerogels are obtained by grinding or comminuting these aerogels.

The organo-silica aerogels may also be prepared by heating the starting silica aerogels within the aforementioned ranges of time and temperature at a pressure in the range of from about 10 p.s.i.g. to about 200 p.s.i.g. in an atmosphere of air, an inert gas such as nitrogen, or steam. In the preparation of the Group I organo-silica aerogels it has been found advantageous to heat the starting silica aerogels in an atmosphere of steam at a pressure of from about 100 to about 200 p.s.i.g. In the preparation of the Group II organo-silica aerogels, which may be prepared either from starting silica aerogels or from the Group I organo-silica aerogels, the heating is preferably carried out in air, either at atmospheric pressure or at the elevated pressure ranges above described and at the temperature and times hereinbefore described for the preparation of the Group II organo-silica aerogels.

The starting silica aerogels which may be employed in producing the novel organo-silica aerogels may advantageously be prepared from acidic silica hydro-organosols having a pH of from about 1.9 and 4.5 and comprising from about 1% to about 9% by weight of silica, from about 8 to about 20 mols, per mol of $SiO_2$, of a water miscible organic liquid such as an alcohol, ketone or ester, for example, methanol, ethanol, isopropanol, acetone, methyl ethyl ketone and the like, and water. Such silica hydro-organosols may be transformed to a silica hydro-organogel, usually by charging the sol to a pressure-resistant vessel and converting the sol to a gel in situ. The hydro-organogels may then be converted to an aerogel by converting substantially all of the liquid phase to a vapor phase and separating the vapor phase without subjecting it to a substantial compressive liquid-solid interface and without appreciable shrinkage in the volume of the gel, for example, in accordance with the liquid removal process of U.S. Patent No. 2,093,454 to Samuel S. Kistler, issued September 21, 1937. The novel organo-silica aerogels described herein, and the processes for preparing same are described in greater detail and claimed in my copending application Serial No. 199,655, filed June 4, 1962, which is assigned to the same assignee as the assignee of the present application.

As stated heretofore, the above described organo-silica aerogels may be employed in compositions compositions comprising any of a wide variety of organic liquids and when so employed will thicken and/or increase the viscosity of such liquids. Thus, classes of organic liquids having a relatively low viscosity, e.g., in the range of from about 2.5 to 25 millipoises at 25° C. can be employed in combination with the novel organo-silica aerogels to provide compositions having a viscosity appreciably above 25 millipoises and up to 500 centipoises at this temperature. Such organic liquids may be organic solvents, for example, solvents used in paint, varnish or lacquer removers, and include liquids such as aliphatic and aromatic alcohols, ketones and esters, for example, ethanol, acetone, methyl ethyl ketone, ethyl acetate, amyl acetate and the like.

Also, classes of organic liquids having relatively higher viscosities, e.g., viscosities ranging from about 100 to 600 centipoises at 25° C., can be used in combination with the novel organo-silica aerogels to provide compositions having viscosities of from 1,000 to 8,000 centipoises at 25° C. Such organic liquids include classes of oleaginous liquids such as oils of animal and vegetable origin, for example cod liver oil, olive oil, corn oil and the like. Also included are lubricating oils such as hydrocarbon motor oils and these may be employed in conjunction with the novel aerogels to provide gel-like bodies having a grease consistency.

In one embodiment of this invention, thin hydrocarbon lubricating oils such as motor oils having viscosities of between 90 and 110 centipoises may be thickened by the dispersion of from 0.2% to 1.5% of either the Group I or Group II organo-silica aerogels to provide compositions having viscosities of from 250 to 500 centipoises at 27° C. when the viscosity measurements are taken on a MacMichael Viscosimeter with a No. 26 wire. More specifically a composition containing a light motor oil (SAE No. 10) and 0.5% by weight of a Group II organo-silica aerogel usually has a viscosity of from 300 to 350 centipoises at 27°C.

Other classes of organic liquids which may be thickened and/or rendered thixotropic include film-forming organic liquids such as liquids containing a dissolved organic film-forming or bonding solid or liquid which, on evaporation of such liquid or by polymerization during or after evaporation of such organic liquid, forms films, coatings or a binder which is capable of bonding two similar (e.g., glass fibres) or two dissimilar materials with a relatively high strength bond.

A particularly useful embodiment of the present invention comprises organic thixotropic compositions comprising natural and/or synthetic polymers in a liquid medium and containing relatively small amounts of the aforedescribed finely divided, amorphous, Group I organo-silica aerogels.

The term "thixotropic" is used herein to denote the property of certain organic liquids, containing the novel organo-silica aerogels, to thicken and to change rapidly, on standing, from a liquid into a gel-like solid mass or body having sufficient cohesive strength to withstand distortion by gravitational force when suspended freely in an inverted receptacle or on a coated object. The gel is also of such a nature that it can be fluidized by the application of mechanical agitation as by shaking, stirring, vibrating and the like. The property of thixotropy as understood herein is thus characterized by a reversible isothermal sol⇌gel transition.

It has presently been found possible to thicken or to render a wide variety of organic liquid resin compositions thixotropic by incorporating therein from 0.2% to 5.0% by weight, based on the weight of the liquid resin composition, of any of the hereindescribed novel, amorphous, organo-silica aerogels having a particle size in the range of from 0.1 to 2.5 microns. For example, liquid coating compositions comprising solutions of high molecular weight film-formers dissolved in organic solvents may be thickened by dispersing in the solution from about 0.2% to about 1.0% by weight, based on the weight of the solution, of the organo-silica aerogels. Also certain organic liquid polymers may be made thixotropic by dispersing therein from about 0.5% to about 3.0% by weight, based on the weight of the composition of any of the organo-silica aerogels. Such compositions are generally employed as adhesives, films, foils, lacquers, paints, stretching lacquers (dopes) and the like and comprise solutions or suspensions of high molecular weight organic film-formers such as, for example, nitrocellulose, cellulose acetate, chlorinated rubber, polyvinyl acetate, polyvinyl chloride, polyacrylic esters, cellulose butyrate, cellulose propionate, and the like, which are dissolved or suspended as fine particles in organic solvents or liquids such as, for example, acetone, ethanol, ethyl acetate, amyl acetate, dioctyl phthalate, etc.

These compositions usually contain from about 40% to 50% by weight of film-formers dissolved or suspended in an organic solvent or liquid and may often have a dispersed phase consisting of pigments or fillers which settle out after standing for relatively short periods of time. Such settling is generally prevented by adding a small amount, e.g., from about 0.2% to 0.5% of the novel organo-silica aerogels to these compositions. Where it is desired that the above described liquid compositions be applied to objects in the form of a spray or spreadable liquid, the addition of from about 0.5% to 3% by weight (depending upon the amount of film-forming materials in the composition) of any of the novel organo-silica aerogels to such compositions will cause them to form thixotropic gels almost immediately on contact with the object to which they are applied and the compositions will then not run or drain from such objects.

Among the compositions referred to above which may be employed with the novel organo-silica aerogels to form a particularly useful embodiment of this invention are plastisol compositions comprising halogenated vinyl or vinylidene resins such as, for example, an emulsion polymerized polyvinyl chloride polymer suspended in a plasticizer such as a phthalate ester, for example, dioctyl phthalate, dibutyl phthalate, dihexyl phthalate, ethyl hexyl phthalate and the like, in which the plasticizer chosen is a plasticizer for the resin employed. Such plastisol compositions are exemplified in U.S. Patent 2,852,482, issued September 16, 1958, to Paul R. Graham and U.S. Patent 2,885,378, issued May 5, 1959, to Joseph R. Darby, both patents being assigned to Monsanto Chemical Company. Since plastisol compositions are used in molding films they must be liquid or at least have an element of fluidity. However, when in the liquid state the halogenated vinyl or vinylidene resin particles and fillers or pigments, which fillers or pigments are often incorporated in such compositions, tend to settle out and render the plastisol composition non-homogeneous and unsuitable for molding films. It has presently been found that the addition of from 0.2% to 5.0%, preferably from 0.2% to 3.0%, by weight of the organo-silica aerogels to such compositions will thicken the composition to the point where it will remain fluid or will form a thixotropic gel which can be transformed to a fluid state by mechanical agitation thereby preventing settling or separation of components within the plastisol compositions.

It has also been found to thicken and/or render thixotropic, polymerizable organic liquid compositions comprising polymerizable resins including solventless varnishes and polyester resin compositions which are used in coating, filling, adhesive and laminating operations by incorporating small amounts of the organo-silica aerogels therein. Such compositions include liquid alkyd resins or solutions of solid alkyd or polyester resins dispersed in a solvent (for example, styrene) which is usually copolymerizable with the polyester resin.

Other liquids which may be employed in combination with the novel organo-silica aerogels in a preferred embodiment of this invention are polymerizable liquids comprising unsaturated alkyd resins. These resins are the reaction products of polyhydric alcohols, mixtures of polyhydric alcohols or mixtures of polyhydric and monohydric alcohols, and an alpha unsaturated alpha, beta carboxylic acid, or a plurality of polycarboxylic acids one of which at least is an unsaturated polycarboxylic acid. Examples of such polyhydric alcohols are ethylene glycol, di- and triethylene glycol, propylene glycol, tetramethylene glycol, glycerine or pentaerithrytol in combination with a monohydric alcohol, etc. Examples of unsaturated polycarboxylic acids are maleic, fumaric and ita-conic acids. The term polycarboxylic acid as used herein is intended to include within its meaning the anhydrides of such acids which may also be employed. In addition to one or more of the unsaturated polycarboxylic acids, saturated polycarboxylic acids may also be present in the reaction mixture referred to above. Examples of such saturated polycarboxylic acids are succinic, adipic, sebacic and phthalic acids. The anhydrides of such acids may also be used.

In addition to the above unsaturated alkyd resins, the polymerizable liquids which may be used in the compositions of the present invention may contain polymerizable substances such as, for example, esters of monohydric alcohols and polycarboxylic acids, including unsaturated polycarboxylic acids, halogenated aromatic polycarboxylic acids and polybasic inorganic acids. Examples of such substances are dialkyl maleate, dialkyl fumarate, dialkyl itaconate, dialkyl chlorophthalates, trialkyl phosphate and the like. Other substances which may be incorporated in these polymerizable liquids are esters of monohydric alcohols and unsaturated polycarboxylic acids which are capable of copolymerizing with unsaturated alkyd resins such as, for example, dioctyl itaconate, dibenzyl itaconate, diethyl fumarate, dibenzyl fumarate and the like.

Esters of acrylic and methacrylic acids may also be used in the present compositions. Examples of such esters are methyl, ethyl, propyl, isopropyl, butyl, isobutyl and alkyl acrylates and the corresponding esters of methacrylic acid. Vinyl monomers may also be used in such compositions including styrene, vinyl acetate, vinyl chloride and combinations thereof and the like.

The above described unsaturated resins may be liquids or solids dissolved in organic liquids and the finely divided amorphous organo-silica aerogels may be directly dispersed in the liquids. When the unsaturated resin is a solid, it is necessary to dissolve the resin in an organic solvent, preferably a solvent which is copolymerizable with the polyester resin, such as, for example, styrene.

There may also be incorporated in the above described polymerizable liquid compositions, small amounts ranging from about 0.5% to 2.0% by weight, based on the weight of the polymerizable liquid, of a polymerization catalyst. Many types of polymerization catalysts, well known to those skilled in the art, may be incorporated in the polymerizable liquid compositions of this invention including, for example, benzoyl peroxide, methyl ethyl ketone, peroxide, cyclo-hexane peroxide and cumene hydroperoxide, which provide the oxygen necessary to effect polymerization.

Generally speaking, when a solid polyester resin is dissolved in an organic solvent the resulting liquid will contain from 30% to 80% by weight of the polyester resin. In one embodiment of this invention it has been found possible to prepare a thixotropic gel composition when a solution of an unsaturated polyester resin of a polyhydroxy alcohol and an unsaturated polycarboxylic acid was dissolved in 40%, based on the weight of the polyester, of styrene and from 1% to 2.5% of either of the novel organo-silica aerogels was dispersed therein. On the other hand, when 1.0% by weight of such organo-silica aerogel is dispersed in the aforementioned resin solution the viscosity of such solution is usually increased from about 850 centipoises to about 3,400 poises at 25° C. where the viscosity measurements are made with a standard Brookfield Model RVT Synchroelectric Viscosimeter operated at a speed of 20 r.p.m. The composition on standing for from 9 to 15 seconds usually becomes a solid mass which reverts to a liquid upon being stirred. On the other hand, a 1% dispersion of a silica aerogel such as described in the White or Marshall patents, when added to the above resin composition, results in a viscosity of only 1,160 centipoises when measured as above described and remains in a liquid state upon standing for more than 8 hours.

A further understanding of the compositions of the present invention will be obtained from the following examples which are intended to illustrate the invention, but not to limit the scope thereof, parts and percentages being by weight unless otherwise specified.

*Example I*

A finely divided amorphous organo-silica aerogel (hereinafter designated as the Group I silica aerogel) comprising a silica polymer having siloxy groups and containing 1.14% by weight of carbon and 1.37% by weight of hydrogen and having an $SiO_2$:C ratio of 15:1 and an $SiO_2$:H ratio of 1.3:1, and further having an average particle size of 2.0 microns, a specific surface area of 340 meters per gram and an external surface area of 1.9 square meters per gram was mechanically dispersed by means of an electric stirrer in two light motor oils in the amounts indicated in the table at the end of this example. Viscosity measurements (also included in the table) were used as an index of thickening.

A finely divided amorphous, organo-silica aerogel (hereinafter designated as the Group II organo-silica aerogel) comprising a silica polymer having siloxy groups and containing 0.5% by weight of carbon and 1.1% by weight of hydrogen and having an $SiO_2$:C ratio of 36:1 and an $SiO_2$:H ratio of 1.4:1 and having substantially the same particle size, specific surface area and external surface area as the Group I organo-silica aerogel was mechanically dispersed by means of an electric stirrer in two light motor oils in the amounts indicated in the following table in which viscosity measurements were used as an index of thickening.

| Composition: | Viscosity Brookfield (centipoises at 27° C.) |
|---|---|
| SAE No. 10 motor oil | 100 |
| SAE No. 10 motor oil+0.5% Group I organo-silica aerogel | 300 |
| SAE No. 10 motor oil+0.5% Group II organo-silica aerogel | 280 |
| SAE No. 20 motor oil | 130 |
| SAE No. 20 motor oil+0.3% Group I organo-silica aerogel | 350 |
| SAE No. 20 motor oil+0.3% Group II organo-silica aerogel | 310 |

The motor oils were substantially thickened by the dispersion therein of the organo-silica aerogels as indicated above. By contrast when the same amount of a finely divided, previously known silica aerogel containing 0.05% carbon and 0.056% by weight of hydrogen, e.g., a silica aerogel such as that described by the Marshall or White patents, was added to the above oils no appreciable thickening occurred.

*Example II*

The Group I and Group II organo-silica aerogels described in the first two paragraphs of Example I were mechanically dispersed with an electric stirrer in the following lacquer compositions to provide the following film-forming resin compositions.

| Composition Number | 1 | 2 | 3 | 4 | 5 | 6 |
|---|---|---|---|---|---|---|
| Ingredients (grams): | | | | | | |
| Polyvinyl chloride | 15.0 | | | 15.0 | | |
| Nitrocellulose | | 13.0 | | | 13.0 | |
| Cellulose acetate | | | 7.5 | | | 7.5 |
| Ethyl acetate | 85.0 | 31.0 | 23.0 | 85.0 | 31.0 | 23.0 |
| Ethanol | | 36.0 | 26.0 | | 36.0 | 26.0 |
| Toluol | | | 11.0 | | | 11.0 |
| Titanium dioxide | 1.5 | | | 1.5 | | |
| Castor oil | 0.3 | 1.2 | 1.1 | 0.3 | 1.2 | 1.1 |
| Group I organosilica aerogel* | 0.3 | 0.6 | 1.0 | | | |
| Group II organosilica aerogel* | | | | 0.3 | 0.6 | 1.0 |

*Dispersed after initial viscosity measurement.

The viscosity of the compositions were tested by measuring the seconds-bubble-rise at 25° C. in a Gardner tube before and after the incorporation of the organo-silica aerogels and the results obtained were as follows:

| Composition | Viscosity in seconds | |
|---|---|---|
| | Initial | After aerogel dispersion |
| 1 | 4 | 250 |
| 2 | 5 | 410 |
| 3 | 4 | 600 |
| 4 | 4 | 220 |
| 5 | 5 | 430 |
| 6 | 4 | 580 |

In contrast when the same amounts of a previously known silica aerogel such as that described in the last paragraph of Example I were added to the foregoing compositions, the viscosity of the composition (e.g., seconds bubble rise) did not exceed 40 in any given instance.

*Example III*

The following plastisol compositions were prepared in which an emulsion-polymerized polyvinyl chloride polymer was suspended in dioctyl phthalate containing dibasic lead phosphite (which phosphite was employed as a stabilizer to prevent decomposition during the heating of the plastisol. To these liquid plastisol compositions the organo-silica aerogels described in Example I were added in the amounts indicated in the following table.

| Composition Number | 7 | 8 | 9 | 10 | 11 | 12 | 13 |
|---|---|---|---|---|---|---|---|
| Ingredients (grams): | | | | | | | |
| Polyvinyl chloride | 100 | 100 | 100 | 100 | 100 | 100 | 100 |
| Dioctyl phthalate | 80 | 80 | 80 | 80 | 80 | 80 | 80 |
| Dibasic lead phosphite | 3 | 3 | 3 | 3 | 3 | 3 | 3 |
| Group I organosilica aerogel | 1 | | 3 | | 5 | | |
| Group II organosilica aerogel | | 1 | | 3 | | 5 | |

The viscosities were measured in a Model HAT Brookfield Viscosimeter using a No. 6 spindle at 2.5 r.p.m., the values obtained being shown in the following table.

| Composition: | Viscosity in poises (25° C.) |
|---|---|
| 7 | 140 |
| 8 | 190 |
| 9 | 2,000 |
| 10 | 1,500 |
| 11 | 15,000 |
| 12 | 10,000 |
| 13 | 50 |

When a silica aerogel per se such as that described in the last paragraph of Example I or an aminated silicate clay (e.g., Bentone) were added to the above compositions in place of the organo-silica aerogels it was necessary to add about 20 grams of each material to the compositions in order to obtain compositions having a viscosity of 10,000 poises.

*Example IV*

An unsaturated polyester resin was prepared by reacting 50 mol percent of phthalic anhydride and 50 mol percent of maleic anhydride with a 25% molar excess of propylene glycol which excess propylene glycol was then distilled off leaving a solid, hard, brittle, unsaturated polyester resin. A solution was prepared by dissolving 60 parts by weight of the above described polyester in 40 parts of styrene. The Group I and Group II silica aerogels described in Example I were separately admixed with portions of the above polyester resin-styrene compositions in a ball mill for one hour in the amounts indicated below. The viscosities were measured using the Model RVT Brookfield Viscosimeter at 20 r.p.m. and at a temperature of 25° C.

| Composition Number | 14 | 15 | 16 | 17 | 18 | 19 |
|---|---|---|---|---|---|---|
| Ingredients (percent): | | | | | | |
| Polyester-styrene solution | 99.5 | 99.0 | 98.5 | 99.5 | 99.0 | 98.5 |
| Group I silica aerogel | 0.5 | 1.0 | 1.5 | | | |
| Group II silica aerogel | | | | 0.5 | 1.0 | 1.5 |

Compositions 15, 16, 18 and 19 when allowed to stand for 30 seconds or more developed into a gel like solid having the consistency of a light grease. Upon mechanical agitation, as provided by the Brookfield Viscosimeter, these compositions were immediately transformed into liquids having the viscosities listed in the following table. Compositions 14 and 17 did not form gels upon standing.

Composition: Viscosity, Brookfield (20 r.p.m.) (centipoises)
- 14 _____ 2,900
- 15 _____ 3,300
- 16 _____ 3,900
- 17 _____ 2,700
- 18 _____ 3,200
- 19 _____ 3,600
- Polyester-styrene solution per se _____ 800

When the above polyester-styrene solution was formulated into compositions wherein like amounts of the aerogel described in the last paragraph of Example I were used in place of the organo-silica aerogels, the viscosity of such compositions did not exceed 900 centipoises in any instance nor did any composition form a thixotropic gel.

*Example V*

Liquid resin compositions were prepared by mixing the amounts of the following ingredients:

| Composition Number | 20 | 21 | 22 | 23 | 24 |
|---|---|---|---|---|---|
| Ingredients (parts by weight): | | | | | |
| Glyceryl tris cyclohexyl maleate | 30.0 | 20.0 | | | 35.0 |
| Dioctyl phthalate | 30.0 | 20.0 | 0.2 | 0.4 | 18.0 |
| Tertiary butyl perbenzoate | 0.6 | 0.4 | | | 0.6 |
| Vinyl acetate-chloride copolymer | | 20.0 | | | 20.0 |
| Decarboxylated castor oil | | | 14.0 | 24.0 | |
| Butyl methacrylate monomer | | 9 | | | 14.8 |

The above compositions were highly fluid and drained readily from glass rods that were dip coated therewith. When 1.5% of the Group I and Group II organo-silica aerogels described in Example I were stirred into separate portions of each of the above compositions the resulting mixtures became highly thixotropic and glass rods dip coated with these compositions exhibited no drainage. However, when 5.0% by weight of the silica aerogel described in the last paragraph of Example I was stirred into the above compositions and glass rods were subsequently dip coated therewith, considerable drainage occurred in a manner similar to that of the original resin compositions.

Generally stated, the amorphous organo-silica aerogels that are used to thicken organic liquids in accordance with the present invention differ not only in ability to thicken organic liquids generally, but also in a number of other important respects, from the previously known silica aerogels such as, for example, those described by Marshall or White. Such previously known silica aerogels, generally have an external surface area of from about 0.5 to 0.8 square meter per gram, an average particle size of from 5 to 9 microns, and a particle size distribution of from 2 to 10 microns. On the other hand, the organo-silica aerogels used in the compositions of the present invention have an external surface area of from about 1.70 to 1.95 square meters per gram and an average particle size of from about 1.0 to 2.5 microns and do not contain an appreciable number of particles having a size larger than 6.0 microns.

What is claimed is:

1. A composition comprising an organic liquid and an amount, sufficient to increase the viscosity of said liquid, of a finely divided amorphous organo-silica aerogel comprising a silica polymer having siloxy groups and containing carbon and hydrogen atoms chemically bound to a portion of the siloxy groups in said aerogel; said aerogel being further characterized in having an $SiO_2$ to carbon atom ratio of from about 10:1 to 50:1 and an $SiO_2$ to hydrogen atom ratio of from about 0.77:1 to 2:1.

2. A composition comprising an organic liquid and an amount of from about 0.2% to about 5.0% by weight, based on the weight of the composition, sufficient to increase the viscosity of said organic liquid of a finely divided, amorphous, organo-silica aerogel comprising a silica polymer having siloxy groups, said organo-silica aerogel being characterized in having an average particle size of between about 1.0 and 2.5 microns, a specific surface area of from about 100 to 400 square meters per gram, and an external surface area of from about 1.70 to 1.95 square meters per gram, said aerogel being further characterized in containing from about 0.4% to about 1.2% by weight of carbon and from about 0.9% to about 1.5% by weight of hydrogen chemically bound to a portion of the siloxy groups, said aerogel being further characterized in having an $SiO_2$ to carbon atom ratio of from about 10:1 to 50:1 and an $SiO_2$ to hydrogen atom ratio of from about 0.77:1 to about 2:1.

3. A composition as in claim 2 wherein the organic liquid is a solution of an organic high molecular weight film forming compound dissolved in an organic solvent.

4. A composition as in claim 2 wherein the organic liquid is a plastisol comprising a polymer selected from the group consisting of halogenated vinyl and vinylidene polymers suspended in a liquid plasticizer for said polymer.

5. A composition as in claim 2 wherein the organic liquid is an organic solvent having dissolved therein an unsaturated solid alkyd resin of a polyhydroxy alcohol and an unsaturated polycarboxylic acid, said solvent being polymerizable with said resin.

6. A composition as in claim 2 wherein the organic liquid is a polymerizable liquid comprising an unsaturated alkyd resin obtained by the esterification of a mixture of ingredients comprising a polyhdric alcohol and an alpha unsaturated alpha, beta carboxylic acid.

7. A composition comprising (1) a liquid plastisol comprising a polyvinyl halide polymer suspended in a liquid plasticizer and (2) an amount of from about 0.2% to about 3% by weight based on the weight of the composition sufficient to increase the viscosity of said plastisol of a finely divided, amorphous organo-silica aerogel comprising a silica polymer having siloxy groups and containing from about 0.4% to 1.2% by weight of carbon and from about 0.9% to 1.5% by weight of hydrogen chemically bound to a portion of the siloxy groups, said organo-silica aerogel being further characterized in having an $SiO_2$ to carbon atom ratio of from about 10:1 to 50:1 and an $SiO_2$ to hydrogen atom ratio of from about 0.77:1 to 2:1, said organo-silica aerogel being further characterized in having a specific surface area of from about 100 to 400 square meters per gram, an external surface area of from about 1.70 to 1.95 square meters per gram and an average particle size of from between about 1.0 to 2.5 microns.

8. A composition as in claim 7 wherein the finely divided, amorphous, organo-silica aerogel is an organo-silica aerogel comprising a silica polymer having siloxy groups and containing from about 0.9% to 1.2% by weight of carbon and from about 1.2% to 1.5% by weight of hydrogen chemically bound to a portion of the siloxy groups, said organo-silica aerogel being further characterized in having an $SiO_2$ to carbon atom ratio of from about 10:1 to about 25:1 and an $SiO_2$ to hydrogen atom ratio of from about 0.77:1 to 1.3:1.

9. A composition as in claim 8 wherein the liquid plastisol comprises a polymerized vinyl chloride polymer suspended in dioctyl phthalate.

10. A composition comprising (1) a polymerizable liquid comprising an unsaturated solid polyester resin of a polyhydroxy alcohol and an unsaturated polycarboxylic acid dissolved in an organic solvent and (2) an amount sufficient to render said compostiion thixotropic of a finely divided, amorphous organo-silica aerogel comprising a silica polymer having siloxy groups and containing from about 0.4% to 1.2% by weight of carbon and about 0.9% to 1.5% by weight of hydrogen chemically bound to a portion of the siloxy groups in said aerogel and having an $SiO_2$ to carbon atom ratio of from about 10:1 to 50:1 and an $SiO_2$ to hydrogen atom ratio of from about 0.77:1 to 2:1, said organo-silica aerogel being characterized in having a specific surface area of from about 100 to 400 square meters per gram, an external surface area of from about 1.70 to 1.95 square meters per gram and an average particle size in the range of from 1.0 to 2.5 microns.

11. A composition comprising (1) a polymerizable liquid comprising an unsaturated solid polyester resin of a polyhydroxy alcohol and an unsaturated polycarboxylic acid dissolved in styrene and (2) an amount of from about 0.5% to about 5.0% by weight, based on the weight of the composition, sufficient to increase the viscosity of said polymerizable liquid of a finely divided, amorphous organo-silica aerogel comprising a silica polymer having siloxy groups and containing from about 0.4% to 0.8% by weight of carbon and about 0.9% to 1.2% by weight of hydrogen chemically bound to a portion of the siloxy groups in said aerogel and having an $SiO_2$ to carbon atom ratio of from about 25:1 to 50:1 and an $SiO_2$ to hydrogen atom ratio of from about 1.3:1 to 2:1, said organo-silica aerogel being characterized in having a specific surface area of from about 100 to 400 square meters per gram, an external surface area of from about 1.70 to 1.95 square meters per gram and an average particle size in the range of from about 1.0 to 2.5 microns.

12. A composition comprising (1) a polymerizable liquid comprising a solution in styrene of an unsaturated solid polyester resin, formed by the reaction of a 25% molar excess of propylene glycol with a mixture of equal mol percentages of maleic anhydride and phthalic anhydride said polymerizable liquid being characterized by having no excess of propylene glycol and (2) an amount of from about 0.5% to 5.0% by weight, based on the weight of the liquid, sufficient to increase the viscosity of said polymerizable liquid of a finely divided, amorphous organo-silica aerogel comprising a silica polymer having siloxy groups and containing from about 0.4% to 0.8% by weight of carbon and from about 0.9% to 1.2% by weight of hydrogen chemically bound to a portion of the siloxy groups in said aerogel and having an $SiO_2$ to carbon atom ratio of from about 25:1 to 50:1 and an $SiO_2$ to hydrogen atom ratio of from about 1.3:1 to 2:1, said organo-silica aerogel being further characterized in having a specific surface area of from about 100 to 400 square meters per gram, an external surface area of from about 1.70 to 1.95 square meters per gram and an average particle size in the range of from about 1.0 to 2.5 microns.

13. A composition comprising (1) a polymerizable liquid comprising a liquid unsaturated alkyd resin obtained by the esterification of a mixture comprising a polyhydric alcohol and an alpha unsaturated alpha, beta polycarboxylic acid and (2) an amount of from about 0.5% to 5.0% by weight, based on the weight of the composition, sufficient to increase the viscosity of said polymerizable liquid of a finely divided, amorphous organo-silica aerogel comprising a silica polymer having siloxy groups and containing from about 0.4% to about 1.2% by weight of carbon and from about 0.9% to about 1.5% by weight of hydrogen chemically bound to a portion of the siloxy groups in said aerogel and having an $SiO_2$ to carbon atom ratio of from about 10:1 to 50:1 and an $SiO_2$ to hydrogen atom ratio of from about 0.77:1 to 2:1, said organo-silica aerogel being further characterized in having a specific surface area of from about 100 to 400 square meters per gram, an external surface area of from about 1.70 to 1.95 square meters per gram and an average particle size in the range of from about 1.0 to 2.5 microns.

14. A composition as in claim 13 wherein the polymerizable liquid is a liquid unsaturated alkyd resin obtained by the esterification of a mixture comprising a polyhydric alcohol and an alpha unsaturated alpha, beta polycarboxylic acid and an ester of a monohydric alcohol and an unsaturated polycarboxylic acid capable of copolymerizing with said unsaturated alkyd resin.

15. The composition of claim 13 wherein the polymerizable liquid comprises liquid diethylene glycol maleate obtained by the esterification of a mixture comprising diethylene glycol, maleic anhydride and a polymerizable ester of an unsaturated monohydric alcohol and polycarboxylic acid.

16. A composition comprising (1) a polymerizable liquid consisting essentially of a liquid unsaturated alkyd resin obtained by the esterification of a mixture comoprising a polyhydric alcohol and an alpha unsaturated alpha, beta polycarboxylic acid and (2) an amount of from about 0.5% to 5.0% by weight, based on the weight of the polymerizable liquid, sufficient to increase the viscosity of said polymerizable liquid of an amorphous, finely divided organo-silica aerogel comprising a silica polymer having siloxy groups and containing from about 0.4% to 0.8% by weight of carbon and from about 0.9% to 1.2% by weight of hydrogen chemically bound to a portion of the siloxy groups in said aerogel and having an $SiO_2$ to carbon atom ratio of from about 25:1 to 50:1 and an $SiO_2$ to hydrogen atom ratio of from about 1.3:1 to 2:1, said organo-silica aerogel being further characterized in having a specific surface area of from about 100 to 400 square meters per gram, an external surface area of from about 1.70 to 1.95 square meters per gram and an average particle size in the range of from about 1.0 to 2.5 microns.

17. A composition comprising (1) a oleagenous liquid and (2) an amount sufficient to thicken said liquid of an amorphous finely divided organo-silica aerogel comprising a silica polymer having siloxy groups and containing from about 0.4% to 1.2% by weight of carbon and from about 0.9% to 1.5% by weight of hydrogen chemically bound to a portion of the siloxy groups in said aerogel and having an $SiO_2$ to carbon atom ratio of from about 10:1 to 50:1 and an $SiO_2$ to hydrogen atom ratio of from 0.77:1 to 2:1, said organo-silica aerogel being further characterized in having a specific surface area of from about 100 to 400 square meters per gram, an external surface area of from about 1.70 to 1.95 square meters per gram and an average particle size in the range of from about 1.0 to 2.5 microns.

18. A composition as in claim 17 wherein the oleagenous liquid is a hydrocarbon lubricating oil and said organo-silica aerogel is employed in an amount sufficient to thicken said oil to a grease consistency.

References Cited by the Examiner

UNITED STATES PATENTS

| | | | |
|---|---|---|---|
| 2,583,605 | 1/52 | Sirianni et al. | 260—40 |
| 2,610,959 | 9/52 | Nordlander | 260—40 |
| 2,887,461 | 5/59 | Hort | 260—40 |

DANIEL E. WYMAN, *Primary Examiner.*